United States Patent
Lentz (10) Patent No.: US 11,185,936 B2
(45) Date of Patent: Nov. 30, 2021

(54) MULTI-FUNCTION POWER SAW SYSTEM

(71) Applicant: David Lentz, Knoxville, TN (US)

(72) Inventor: David Lentz, Knoxville, TN (US)

(*) Notice: Subject to any disclaimer, the term of this patent is extended or adjusted under 35 U.S.C. 154(b) by 0 days.

(21) Appl. No.: 16/395,010

(22) Filed: Apr. 25, 2019

(65) Prior Publication Data

US 2019/0358719 A1     Nov. 28, 2019

Related U.S. Application Data

(60) Provisional application No. 62/662,882, filed on Apr. 26, 2018.

(51) Int. Cl.
    *B23D 45/02*        (2006.01)
    *B23D 45/04*        (2006.01)

(52) U.S. Cl.
    CPC ......... *B23D 45/021* (2013.01); *B23D 45/044* (2013.01)

(58) Field of Classification Search
    CPC ........ B23D 45/028–048; B23D 45/024; B23D 45/025
    See application file for complete search history.

(56) References Cited

U.S. PATENT DOCUMENTS

| | | | | |
|---|---|---|---|---|
| 4,445,412 A | * | 5/1984 | Peters | B23D 47/025 144/154.5 |
| 4,587,875 A | * | 5/1986 | Deley | B23D 45/024 83/471.3 |
| 4,887,653 A | * | 12/1989 | Thomas | B23D 47/025 144/286.1 |
| 6,857,456 B2 | * | 2/2005 | Manning | B25H 1/10 144/286.5 |
| 8,539,870 B2 | * | 9/2013 | Behr | B23D 47/08 83/471.3 |
| 2003/0005801 A1 | * | 1/2003 | Calcote | B23D 47/025 83/438 |
| 2006/0045643 A1 | * | 3/2006 | Petersen | B27C 5/02 409/182 |

* cited by examiner

*Primary Examiner* — Kenneth E Peterson
(74) *Attorney, Agent, or Firm* — Pitts & Lake, P.C.

(57) ABSTRACT

A power saw system including a workstation having a table top surface, a saw arm coupled to the workstation at a first hinge member, the saw arm being configured to pivot toward and away from the table top surface about the first hinge member, a circular saw coupled to a distal end of the saw arm, and a second hinge member provided to the saw arm between the first hinge member and the circular saw, the second hinge member configured such that circular saw can be selectively rotated about the second hinge member in a direction lateral to an axis of the saw arm.

13 Claims, 5 Drawing Sheets

MULTI-FUNCTION POWER SAW SYSTEM

CROSS-REFERENCE TO RELATED APPLICATIONS

This application claims the benefit of U.S. Provisional Patent Application Ser. No. 62/662,882, filed on Apr. 26, 2018, which is incorporated herein in its entirety by reference.

FIELD OF INVENTION

The present general inventive concept relates to power tool work stations, and, more particularly, to a multi-use work station with a plurality of saw and router capabilities.

BACKGROUND

Material processing areas often contain a variety of power tools, which may include a table saw, miter saw, and router, each with a separate table. Other possible power tools may include a vacuum system, drill press, hand saws, sanding equipment, lathes, etc. Each piece of equipment typically requires a dedicated amount of floor space, which is often at a premium in a work setting.

One widely used power tool, the table saw, may be used to perform measured cuts on large pieces of material, and typically requires a large table top for the stability of the piece as well as clearance in the front and rear of the saw as the material is directed across the saw blade. A miter saw may be used to make precise cuts at precise angles, and also requires a table top surface to support the material being processed. Another popular power tool, the router, may be used by hand or may be used in a hands free mode by mounting the router to a table allowing material to be directed across the router bit.

In conventional systems, users of power equipment are required to provide floor space and acquire multiple work stations to accommodate each desired piece of equipment. Therefore, as minimizing required work space would be valuable to both private and commercial users of these power tools, it would be desirable to combine the functionality of various power tools into a single workstation.

BRIEF SUMMARY

According to various example embodiments of the present general inventive concept, a workstation is provided that includes a saw arm that may be easily converted between miter saw functionality and table saw functionality.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a power saw system including a workstation having a table top surface, a saw arm coupled to the workstation at a first hinge member, the saw arm being configured to pivot toward and away from the table top surface about the first hinge member, a circular saw coupled to a distal end of the saw arm, and a second hinge member provided to the saw arm between the first hinge member and the circular saw, the second hinge member configured such that circular saw can be selectively rotated about the second hinge member in a direction lateral to an axis of the saw arm.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Various example embodiments of the present general inventive concept provide a workstation that includes a saw arm that may be easily converted between miter saw functionality and table saw functionality by forming a novel conversion hinge on the saw arm to pivot a power saw between the two functions. Various example embodiments may also provide a router which is also able to be incorporated into the same workstation. Such a power tool station may be used in various material processing areas such as woodworking facilities, commercial trades, manufacturing facilities for shaping materials. While the example embodiments described herein are typically discussed in terms of woodworking, it is understood that various other materials may be processed, such as light weight metals, foam, plastics, and so on.

Figure 1:
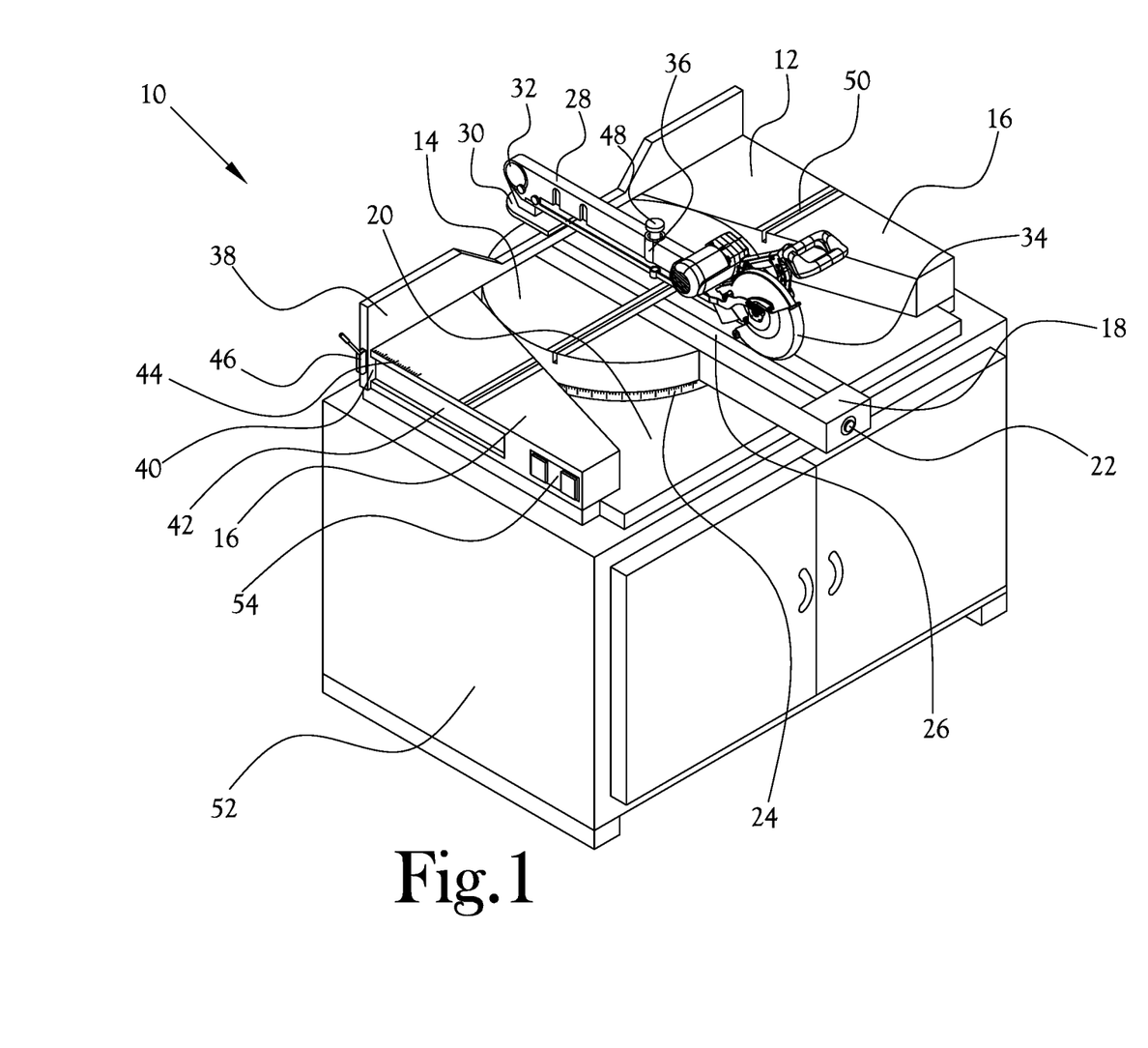
FIG. 1 illustrates a power saw system according to an example embodiment of the present general inventive concept.

FIG. 1 illustrates a power saw system according to an example embodiment of the present general inventive concept. The power saw system 10 illustrated in FIG. 1 is arranged for a miter saw operation. As illustrated in FIG. 1, the power saw system 10 includes a workstation having a table top surface 12 that includes a rotatable turn base 14, or miter table, and two table top side portions 16 respectively arranged on either side of the turn base 14. The top surfaces of the turn base 14 and table top side portions 16 are substantially planar in forming the table top surface 12. The turn base 14 includes a miter adjusting lever 18 extending therefrom to be used in positioning the turn base 14 at a desired position for a miter saw operation. When being rotated, the miter adjusting lever 18 moves through a recessed area 20 formed between the table top side portions 16 not occupied by the turn base 14. The miter adjusting lever 18 includes a lock button 22 or similar locking mechanism to fix the turn base 14 in a desired position. Miter scale indicia 24, such as a miter scale or degree scale, are provided on a floor of the recessed area 20 to aid in the desired positioning of the turn base 14. A first saw groove 26, or miter saw groove, is formed on at least a portion of the turn base 14 and/or miter adjusting lever 18 to receive a portion of the edge of a power saw blade during a miter saw operation. Although the first saw groove 26 is illustrated as extending along substantially the entire length from a far edge of the turn base 14 to near the end of the miter adjusting lever 18, it is understood that different lengths and/or configurations may be provided. A fence 38 is provided on top of the table top surface 12, extending away from the table top surface 12 in a perpendicular arrangement. Boards or other materials may be braced against the fence 38 during sawing operations. The fence 38 is slidable along the table top surface 12, and may have coupling portions 40 that fit in side grooves 42 respectively provided on outer side edges of the table top side portions 16. Linear scale 44 indicia are provided on the table top surface 12 to aid in positioning of the fence 38, and a fence securing lever 46 or other such mechanism is provided to fix the fence 38 in the desired position.

As illustrated in FIG. 1, a saw arm 28 is coupled to the turn base 14 by a mounting assembly 30. A first hinge member 32, or miter saw hinge, is provided to the saw arm 28 proximate the mounting assembly 30, and is configured such that the saw arm 28 is selectively pivotable as the first hinge member 32 to move a circular saw 34, or power saw, toward and away from the table top surface 12 in a miter saw operation. The saw 34 is illustrated in a lowered position for a miter sawing operation in FIG. 1, but it is understood that the saw 34 is movable up and down in a typical miter saw fashion. Also, while not illustrated herein, it is understood that other typical miter saw features, such as being slidable toward and away from the mounting assembly 30, and/or rotating about an axis of the saw arm 28 for a beveling saw operation, may be included in example embodiments without departing from the scope of the present general inventive concept. A second hinge member 36, or conversion hinge, is provided to the saw arm 28 between the first hinge member 32 and the saw 34. This conversion hinge 36 is configured such that the circular saw 34 can be selectively rotated about the conversion hinge 36 in a direction lateral to the axis of the saw arm 28. Thus, the saw 34 can be rotated to a position, for example, that is perpendicular to the axis of the saw arm 28, so that the saw 34 is parallel to the fence 38 to perform to enable a table saw functionality. While it is understood that a table saw is known as a circular saw located under a table surface, with only a portion of the blade being located above that table surface, the arrangement of the saw 34 to be perpendicular to the fence 38 in the present general inventive concept allows a board or other material to be moved along the table top surface 12 in abutment with the fence 38 to perform a similar action that is used with a table top saw, and is referred to herein as table saw functionality. The conversion hinge 36 may be provided with a conversion hinge fixing member 48, such as a rotatable tension knob or handle, to fix the position of the saw 34 relative to the conversion hinge 36. A second saw groove 50 is provided along at least a portion of the table top surface 12, parallel to the fence 38, to receive at least a portion of a blade of the saw 34 when being used for table saw functionality. Thus, when the turn base 14 is in a zero degree position, which is used for a cross cut in a miter saw operation, the first saw groove 26 will be perpendicular to the second saw groove 50 and the fence 38. Although the second saw groove 50 is illustrated as extending substantially along an entirety of the table top surface 12, it is understood that different lengths and/or configurations may be present in different example embodiments. For example, in various example embodiments the second saw groove 50 may only be formed at a location at which the saw will be positioned for table saw functionality when the turn base 14 is positioned at zero degrees, since that places the blade of the saw 34 parallel to the fence 38. In various example embodiments the saw may be rotatable in either direction about the conversion hinge 36.

Figure 2:
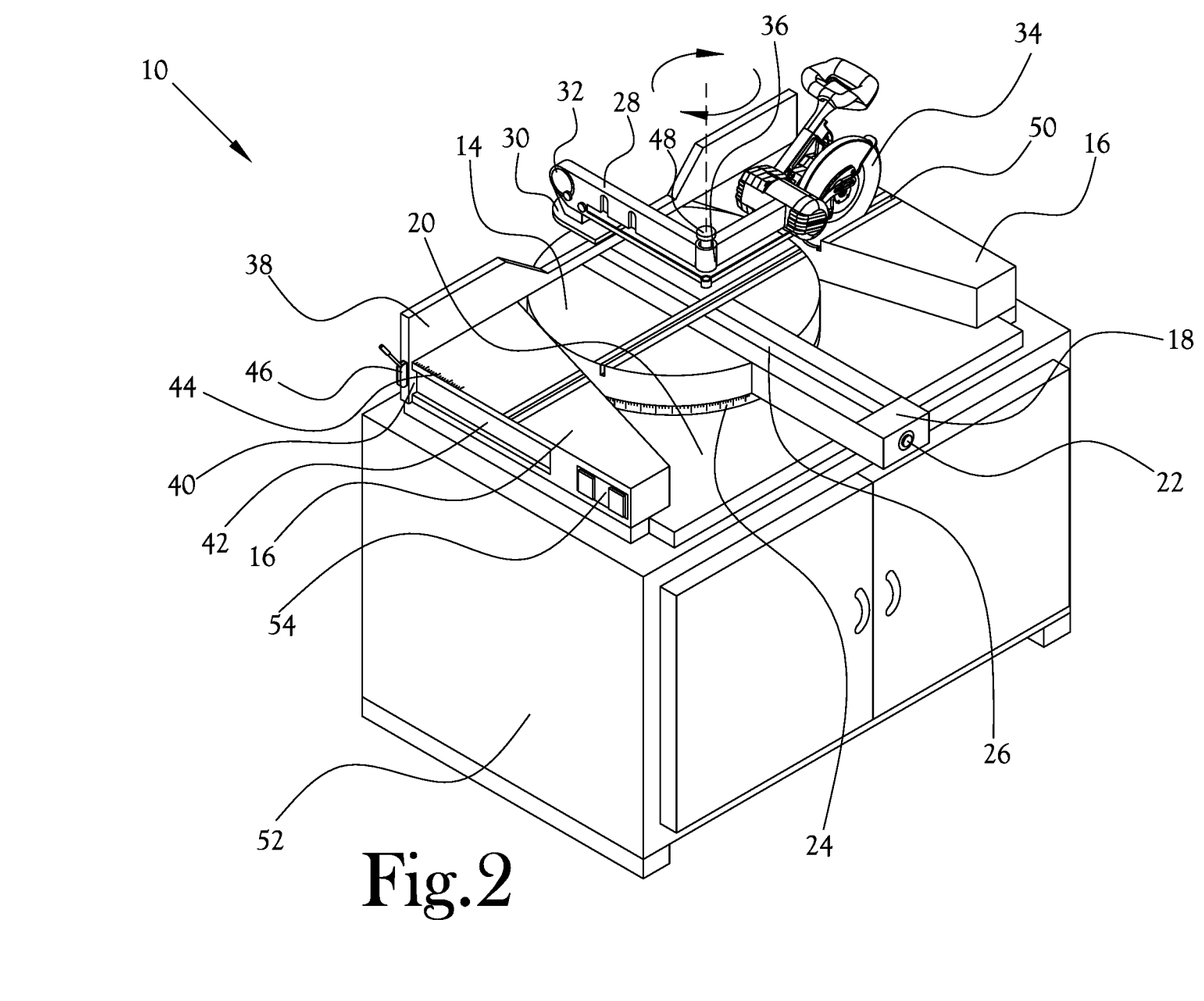
FIG. 2 illustrates the power saw system of FIG. 1 with the saw turned to perform a different functionality.

FIG. 2 illustrates the power saw system of FIG. 1 with the saw turned to perform a table saw functionality. As illustrated in FIG. 2, the turn base 14 is arranged such that the miter adjusting lever 18 is at zero degrees, and the saw 34 has been rotated such that the blade of the saw 34 is perpendicular to the axis of the saw arm 28, and parallel to the fence 38, and thus is aligned with the second saw groove 50. While the example embodiments illustrated in FIGS. 1 and 2 show the saw 34 being coupled to the conversion hinge 36 by an extension of saw arm, it is understood that in various example embodiments, various lengths of saw arm may be provided between the saw 34 and the conversion hinge 36, and in other various example embodiments the saw 34 may be coupled directly to the conversion hinge 36. For table saw functionality, when the saw 34 is fixed in position for table saw functionality, the saw arm 28 may be raised before fixing the saw 34 in position, and then lowered once the saw 34 is fixed such that the blade of the saw rests at least partially in the second saw groove 50. As illustrated in FIGS. 1-2, the workstation may include a lower cabinet 52 to which the workstation is fixed to a top thereof. The lower cabinet may include power buttons 54 or other such controls to control the various operations of the power saw system, and may house the electrical connections used to control and power the components of the system.

Figure 3:
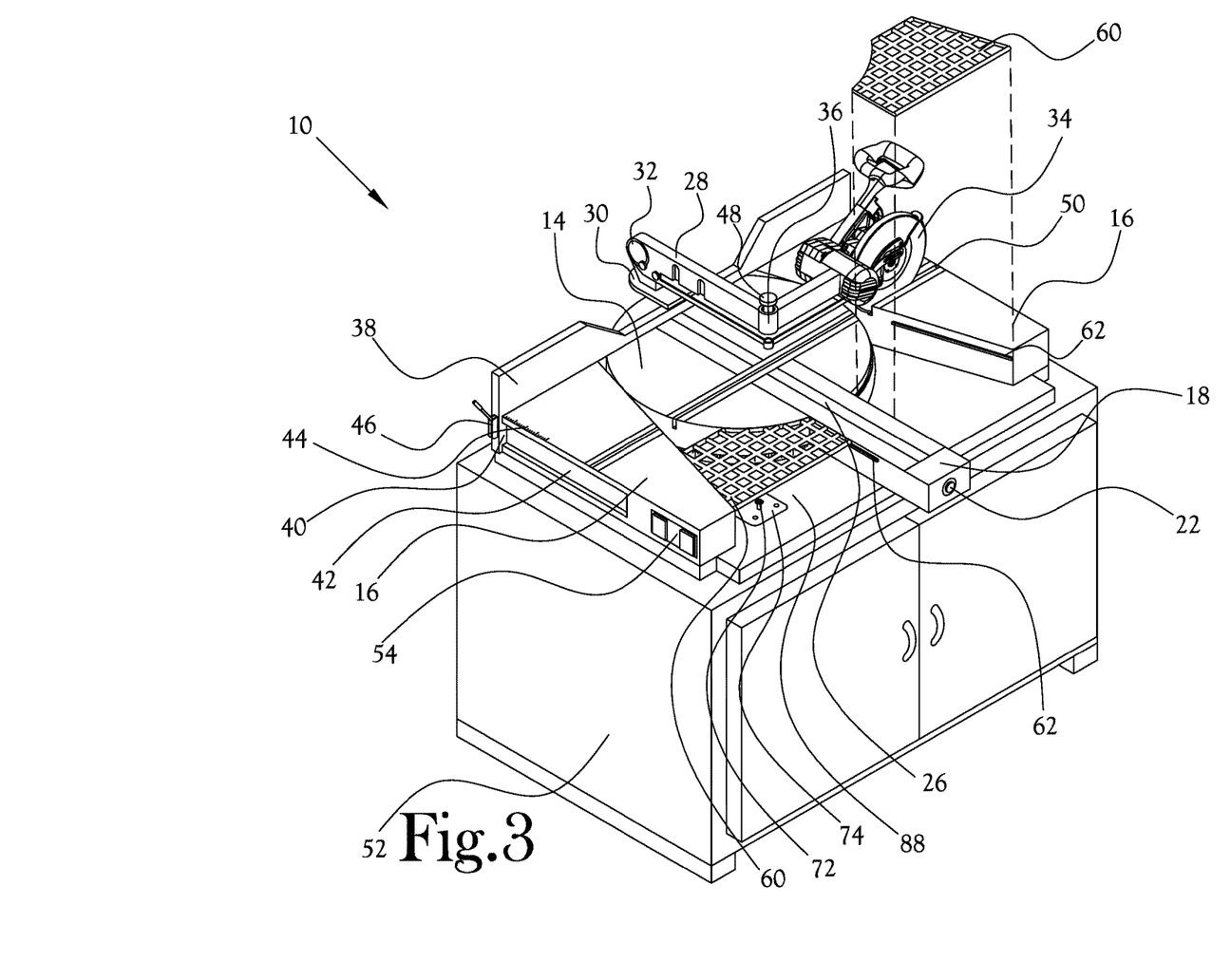
FIG. 3 illustrates a power saw system according to another example embodiment of the present general inventive concept.

FIG. 3 illustrates a power saw system according to another example embodiment of the present general inventive concept. In the example embodiment illustrated in FIG. 3, various optional features have been added to the power saw system. A pair of table top inserts 60 have been provided to extend the table top work surface to the area over the recessed area 20. As illustrated in this example embodiment, a plurality of lips 62 have been provided proximate the upper edges of the tabletop side portions 16 and the miter adjusting lever 18, and the table top inserts 60 may be simply laid upon the lips to provide an upper work surface that is substantially planar with the rest of the table top surface 12. While the inserts 60 of FIG. 3 are illustrated a grate type plates, which will be beneficial for a router feature discussed herein, various other example embodiments may have different configurations, and may have legs or other features of their own to position the inserts in the recessed area(s) 20. The inserts 60 may be simply stored in the cabinet 52 when not in use. As illustrated in FIG. 3, another optional feature includes a router bit 72 extending upward from a floor 88 of the recessed area 20 to be used in a router operation. As explained in more detail in the description of FIGS. 4-6, the router may be selectively raised and lowered to a desired height for a router operation.

Figures 4, 5, 6:
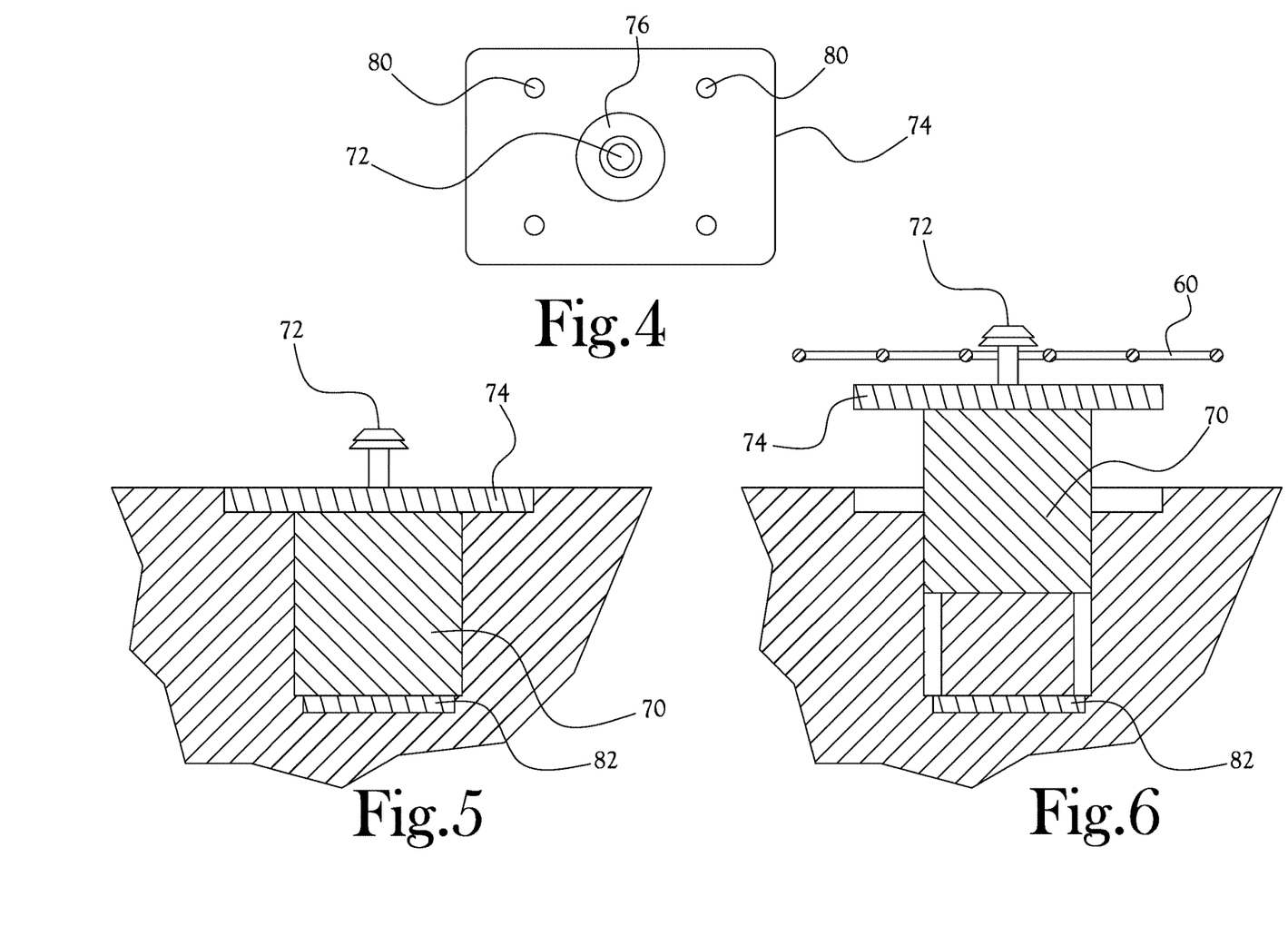
FIGS. 4-6 illustrates a router assembly of FIG. 3 according to example embodiment of the present general inventive concept.

FIGS. 4-6 illustrates a router assembly of FIG. 3 according to example embodiment of the present general inventive concept. As illustrated in FIGS. 4-6, the router assembly includes a router 70 with a router bit 72, the router 70 being affixed to a bottom surface of a plate 74 that lies in a recessed portion of the floor 88 of the recessed area 20. FIG. 4 illustrates a top view of the plate 74, which has a central opening 76 through which the router bit 72 extends, and which has a plurality of bolt holes 80 used to bolt the plate 74 to the router 70. In this example embodiment, the plate 74 is arranged to rest substantially flush with the floor 88 of the recessed area 20. One function of the plate 74 is to guard against debris dropping down onto the router 70 and into the cabinet 52. An electrically powered elevating device 82 is provided to selectively lift the router 70 up to a desired position for a routing operation. Therefore, the router bit 72 may be used on small material contacting the floor 88 of the recessed area 20, or the router assembly may be raised such that the router bit 72 extends through an opening in the insert 60 to be used on larger material laying across the table top surface 12. In various example embodiments, manual elevating devices may be used to adjust the position of the router 70. In various example embodiments the plate 74 may be omitted, and the top of the router 70 may be arranged to be substantially flush with, and filling an opening of, the floor 88 of the recessed area 20.

Figure 7:
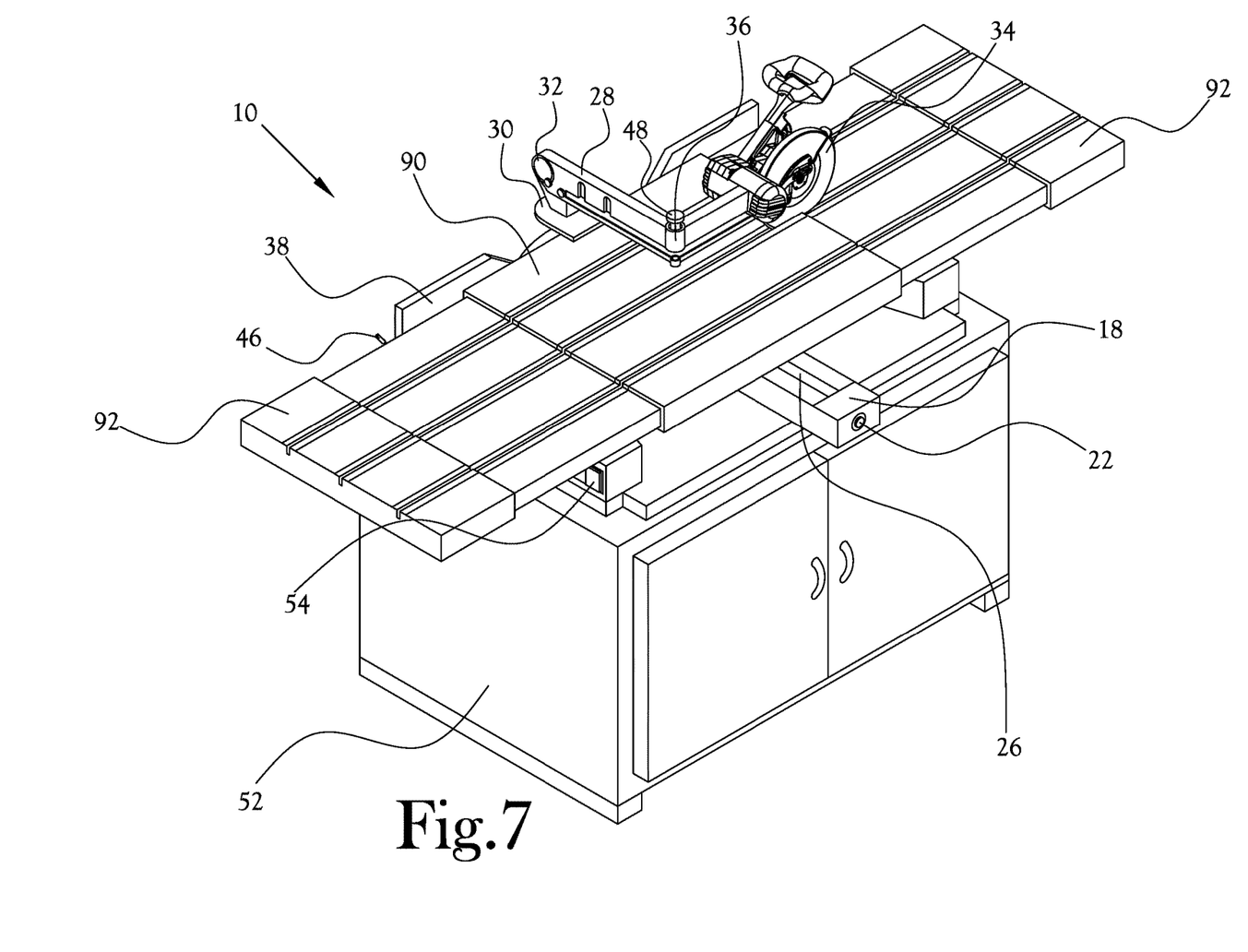
FIG. 7 illustrates a table top overlay for a power saw system according to an example embodiment of the present general inventive concept.

FIG. 7 illustrates a table top overlay for a power saw system according to an example embodiment of the present general inventive concept. In this example embodiment, a table top overlay 90 is configured to be placed over the table top surface 12 to provide a larger work are for table saw functionality on larger pieced of material. In various example embodiments, the overlay 90 may include extensions 92 that may be slid out to increase the work are even more. The extensions 92 may be simply slid back into the main body of the overlay 90 when not needed, and the entire overlay may be stored in the cabinet 52 when not in use.

Various example embodiments of the present general inventive concept provide for the combination of a table saw, miter saw, and router into a single table station. A single saw is configurable to be used as a table saw and a miter saw through the addition of a hinge on the saw arm. Some example embodiments are also configured with a router that may be retractable below a surface of the table when not in use. The station is operable with table saw functionality, and may be generally referred to as a table saw herein, when the hinge is arranged to place the saw at an angle of 90° relative to the saw arm. The saw blade is then parallel to the station's adjustable fence. The fence may slide in a track and may be moved to accommodate the size of the desired cut. The station may be equipped with an extendable work surface which extends from beneath the station to allow for a larger table top surface when in use as a table saw. The extendable work surface is usable to accommodate larger pieces of material needing to be processed. The station may be operable as a miter saw when the hinge is pivoted to an angle of 180° relative to the saw arm. The angle of the saw blade may be changed to allow for miter cuts. The angle may be adjusted clockwise and counter clockwise from the 0° reference angle on an angle measurement scale such that mirrored miter cuts may be executed. The miter saw may be operated as a chop saw by raising then lowering the assembly to cut into a stationary material. The station may be operable as a router when the router is raised so that the router bit extends through a cutout of an insert plate. Consolidating multiple pieces of equipment into a single station reduces the amount of floor space required for the equipment and reduces the investment required to purchase the equipment. Combining equipment such as a router, miter saw, and table saw into a single power tool station reduces the need for three separate power tool tables therefore saving valuable floor space and the cost associated with three tables versus a single table. The use of a hinge connecting a saw to a saw arm allows a single saw to operate as both a table saw and a miter saw, saving the cost of purchasing two separate power tools.

The saw may be a conventional material processing saw ordinarily comprised of a saw assembly mounted on a central axis which is connected to an alternating current (AC) motor or other suitable power source. The saw may provide a circular saw blade with a serrated outer perimeter that the saw spins about a central axis. The serrated outer perimeter cuts into a material when the saw is placed in contact with the surface of the material. The mounting assembly may be attached to the table top through any conventional means such as the use of nuts, bolts, and washers. The table top may be attached to the cabinet by any conventional means such as screws and brackets. The cabinet may have door handles which allow access to the interior of the cabinet. Access to the cabinet is useful for accessing the power supply for the station, access to the router, and for cleaning purposes. The cabinet may be equipped with optional handles and optional wheels, which increase the portability of the station, allowing it to be easily and quickly relocated.

The router may be any industry standard router comprised of a bit holder connected to a central axis in turn connected to an alternating current (AC) motor or other suitable power source. The router provides a router bit which comes in a variety of shapes to provide different detailed patterns on the material being processed. According to various example embodiments, the method of raising and lowering the router may be dependent upon the specific model and type of router used. Methods may include a slide adjustment with a locking knob or latch, or a spiral adjustment mechanism.

Various example embodiments of the present general inventive concept may provide a power saw system including a workstation having a table top surface, a saw arm coupled to the workstation at a first hinge member, the saw arm being configured to pivot toward and away from the table top surface about the first hinge member, a circular saw coupled to a distal end of the saw arm, and a second hinge member provided to the saw arm between the first hinge member and the circular saw, the second hinge member configured such that circular saw can be selectively rotated about the second hinge member in a direction lateral to an axis of the saw arm. The circular saw may be selectively rotatable to a position perpendicular to the saw arm. The power saw system may further include a fence provided on the table top surface and positioned perpendicularly to the table top surface, the fence being configured to brace a material undergoing a sawing operation on the table top surface. The power saw system may further include a first saw groove provided in the table top surface parallel to the axis of the saw arm to receive a portion of the circular saw during a miter saw operation, and a second saw groove provided in the table top surface spaced away from and parallel to the fence to receive a portion of the circular saw during a table top saw operation. The table top surface may include a turn base having a miter adjusting lever extending therefrom, and two side portions respectively provided to either side of the turn base, wherein a recessed portion is formed between the two side portions to allow movement of the miter adjusting lever when positioning the turn base. The power saw system may further include an electrically powered router mounted under a floor of the recessed portion, and an opening formed in the floor of the recessed portion over the router, and configured such that the router may be selectively raised to a desired position at least partially above the floor of the recessed portion. The router may be configured to be selectively raised to a position such that a router bit of the router extends above the table top surface. The power saw system may further include a plate configured to occupy the opening formed in the floor of the recessed portion, the plate having a through hole configured to receive the router bit therethrough, wherein the router is affixed to a bottom surface of the plate. The router may be selectively raised and lowered by an electrically powered elevating device. The power saw system may further include a pair of table top inserts formed to respectively fit in the recessed portion on either side of the miter adjusting lever when the miter adjusting lever is positioned perpendicularly to the fence, wherein a top surface of the table top inserts is substantially flush with the table top surface when the table top inserts are placed in the recessed portion. The power saw system may further include lip members respectively provided on edges of the side portions facing the recessed portion, and on either side of the miter adjusting lever, the lip members being configured to support the table top inserts when the miter adjusting lever is positioned perpendicularly to the fence. The power saw system may further include a table top overlay configured to fit over at least a portion of the table top surface to provide an alternate work surface having more surface area than the turn base and two side portions. The table top overlay may include extensions configured to slide out of the respective sides of the table top overlay to extend the alternate work surface. The power saw system may further include a cabinet configured to support the workstation, wherein power controls configured to control functions of the workstation are provided on a surface of the cabinet, and wherein electrical connections to components of the workstation are routed through the cabinet. The power saw system may further include a tension member provided to the second hinge member to fix a position of the circular saw in a desired position relative to the second hinge member.

Various example embodiments of the present general inventive concept may provide a power tool work station configured to provide miter cuts, table saw cuts, and router cuts in a single workstation, including a workstation with a flat horizontal surface, a circular saw blade powered by an electric motor, the circular saw blade being affixed to a saw arm that is affixed to the flat horizontal surface, a conversion hinge being configured to position the circular saw in a table saw configuration or a miter saw configuration, and a router powered by an electric motor, the router being affixed beneath the flat horizontal surface to a removable mounting device configured to raise the router through an opening in the flat horizontal surface. Thus, a single station may have a saw configured to be used as a miter saw or table saw, and in some example embodiments as a router with an undermounted router tool. The saw may be affixed to a saw arm by a conversion hinge which allows the saw to be pivoted to cut parallel to a fence when configured as a table saw. The hinge allows the saw to pivot to a position that is perpendicular to the fence, allowing the saw to operate as a miter saw. A router may be mounted to an insert plate and suspended beneath the table top. The router may be raised, allowing the bit to pass through a cutout in the insert such that the router bit may be used for material processing. The router may be lowered to a storage position when not in use.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A power saw system, comprising:
   a workstation having a table top surface;
   a saw arm coupled to the workstation at a first hinge member, the saw arm being configured to pivot toward and away from the table top surface about the first hinge member;
   a circular saw coupled to a distal end of the saw arm; and
   a second hinge member provided to the saw arm between the first hinge member and the circular saw, the second hinge member configured such that circular saw can be selectively rotated about the second hinge member in a direction lateral to an axis of the saw arm;
   wherein the table top surface comprises:
      a rotatably coupled turn base having a miter adjusting lever extending therefrom, a first saw groove being formed on at least a portion of the miter adjusting lever, and
      two side portions respectively provided to either side of the turn base, the side portions each having an upper planar surface that is coplanar with an upper surface of the rotatably coupled turn base, a second saw groove being formed on at least a portion of the two side portions so as to be substantially perpendicular to the first saw groove when the turn base is positioned at zero degrees, the circular saw being positionable in the second saw groove,
      wherein a recessed portion with a floor is formed between the two side portions to allow movement of the miter adjusting lever over the floor of the recessed portion when rotating the turn base.

2. The power saw system of claim 1, wherein the circular saw is selectively rotatable to a position perpendicular to the saw arm.

3. The power saw system of claim 1, further comprising:
   a fence provided on the table top surface and positioned perpendicularly to the table top surface, the fence being configured to brace a material undergoing a sawing operation on the table top surface.

4. The power saw system of claim 1, further comprising:
   a cabinet configured to support the workstation;
   wherein power controls configured to control functions of the workstation are provided on a surface of one of the two side portions.

5. The power saw system of claim 1, further comprising a tension member provided to the second hinge member to fix a position of the circular saw in a desired position relative to the second hinge member.

6. The power saw system of claim 1, further comprising:
   an electrically powered router mounted under the floor of the recessed portion; and
   an opening formed in the floor of the recessed portion over the router, and configured such that the router may be selectively raised to a desired position at least partially above the floor of the recessed portion.

7. The power saw system of claim 6, wherein the router is configured to be selectively raised to a position such that a router bit of the router extends above the table top surface.

8. The power saw system of claim 7, further comprising:
   a plate configured to occupy the opening formed in the floor of the recessed portion, the plate having a through hole configured to receive the router bit therethrough;
   wherein the router is affixed to a bottom surface of the plate.

9. The power saw system of claim 6, wherein the router is selectively raised and lowered by an electrically powered elevating device.

10. The power saw system of claim 1, further comprising:
    a pair of table top inserts formed to respectively fit in the recessed portion on either side of the miter adjusting lever when the miter adjusting lever is positioned perpendicularly to the fence;
    wherein a top surface of the table top inserts is substantially flush with the table top surface when the table top inserts are placed in the recessed portion.

11. The power saw system of claim 10, further comprising:
    lip members respectively provided on edges of the side portions facing the recessed portion, and on either side of the miter adjusting lever, the lip members being configured to support the table top inserts when the miter adjusting lever is positioned perpendicularly to the fence.

12. The power saw system of claim 1, further comprising:
    a table top overlay configured to fit over at least a portion of the table top surface to provide an alternate work surface having more surface area than the turn base and two side portions.

13. The power saw system of claim 12, wherein the table top overlay includes extensions configured to slide out of the respective sides of the table top overlay to extend the alternate work surface.

* * * * *